INVENTOR
Gerhard Lindae
by
Michael J. Striker

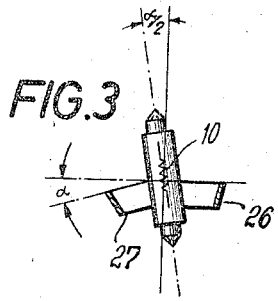
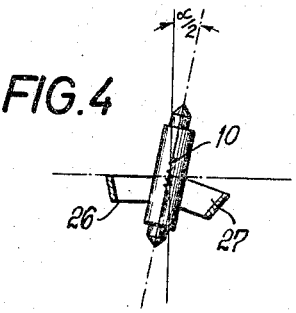
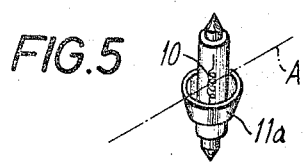
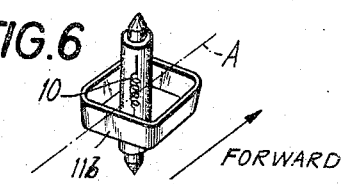
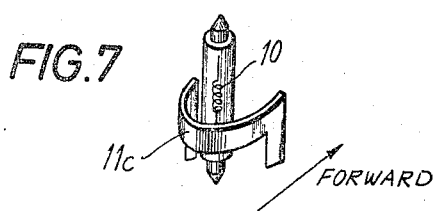
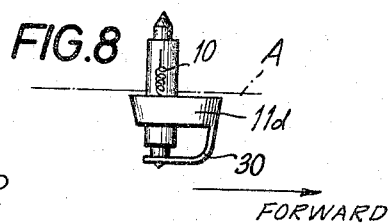
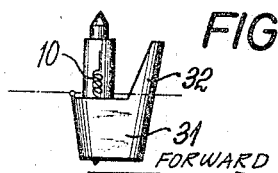
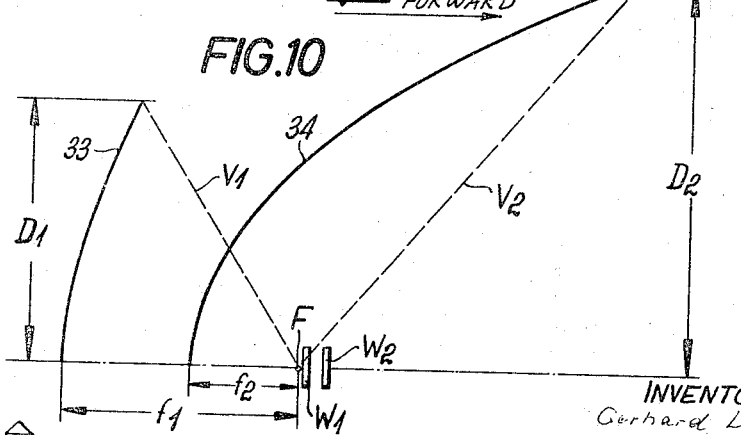
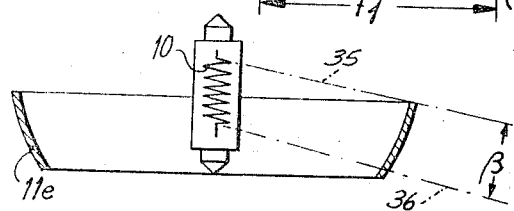

ically for the invention are set forth in particular in the
United States Patent Office 3,317,772
Patented May 2, 1967

3,317,772
HEADLIGHT ARRANGEMENT FOR AUTOMOTIVE VEHICLES INCLUDING A REFLECTOR AND A LIGHT SHIELD MEANS
Gerhard Lindae, Fellbach, Wurttemberg, Germany, assignor to Robert Bosch G.m.b.H., Stuttgart, Germany
Filed May 5, 1964, Ser. No. 365,041
Claim priority, application Germany, May 7, 1963, B 71,785
23 Claims. (Cl. 313—113)

The invention concerns a headlamp arrangement for automotive vehicles and the like including at least two headlights having each a reflector and a source of light therein.

In arrangements of this type the reflectors are usually and preferably of parabolic shape and the arrangement conventionally comprises different filaments for producing alternatively a high beam and a low beam or a bright light and a dim light. At least one filament is arranged within each reflector. In any case, the bright light filament is located as closely as possible to the focus of the respective reflector and extends substantially in a horizontal plane through the optical axis of the reflector. However, the dim light filament extends longitudinally and is located in front of the focus of the respective reflector and is further supplemented with an opaque shield for reducing the light emission in certain directions.

In such conventional head lamp arrangements, the dim light is produced by a filament extending horizontally. Consequently, the illuminated area e.g. on a projection screen positioned at a certain distance from the head lamp with a surface extending transversely of the optical axis of the reflector is comparatively large. Also the dark area in the center of the illuminated area is comparatively large with the result that the intensity of the illumination and the contrast between light and dark at the boundaries of these areas are comparatively small. In view of these and other disadvantages of the conventional head lamp arrangement, it is one object of the present invention to provide for a head lamp arrangement which is capable of increasing the contrast between light and dark at the boundaries of the illuminated areas, to increase also the intensity of illumination and consequently the effective range of illumination.

It is another object of this invention to provide for an arrangement as set forth which is also capable of reducing the danger of dazzling or blinding persons exposed to the light beam emanating therefrom.

It is still another object of this invention to provide for an arrangement of the type mentioned above which produces the desired improved effects in a comparatively very simple manner.

With above objects in view the invention includes in a head lamp arrangement for automotive vehicles and the like including at least two headlights having each a reflector and a source of light therein, in combination, in each headlight at least one filament for dim light located at a predetermined distance in front of the focus of the respective reflector and extending along a line transverse of a horizontal plane through the optical axis of said reflector; and elongated opaque shield means located at least partly in the rear of said filament and at least partly surrounding the latter and having an upper edge at least a portion of which extends in a substantially horizontal plane.

The novel features which are considered as characteristic for the invention are set forth in particular in the appended claims. The invention itself, however, both as to its constructions and its method of operation together with additional objects and advantages thereof, will be best understood from the following description of specific embodiments when read in connection with the accompanying drawings in which:

FIG. 3 is a partial elevational view of an arrangement according to the invention, a tubular light bulb being viewed in forward direction along the optical axis of the arrangement together with a sectioned portion of a shield in a form and position to be used in countries where right-hand driving is required;

FIG. 4 is a similar illustration of an arrangement according to FIG. 3, with the difference that it is formed and positioned for use in countries where left-hand driving is required;

FIGS. 5–9 are illustrations of various modifications of a combination of a tubular bulb with a field according to the invention;

FIG. 10 is a diagram illustrating schematically certain relations between a reflector and a filament in an arrangement according to the invention; and FIG. 11 is a diagrammatic illustration of the combination of a filament and an annular shield according to the invention, the latter shown in axial section, and illustrating a certain relation between the dimensions of the filament and the shield.

Figure 1:
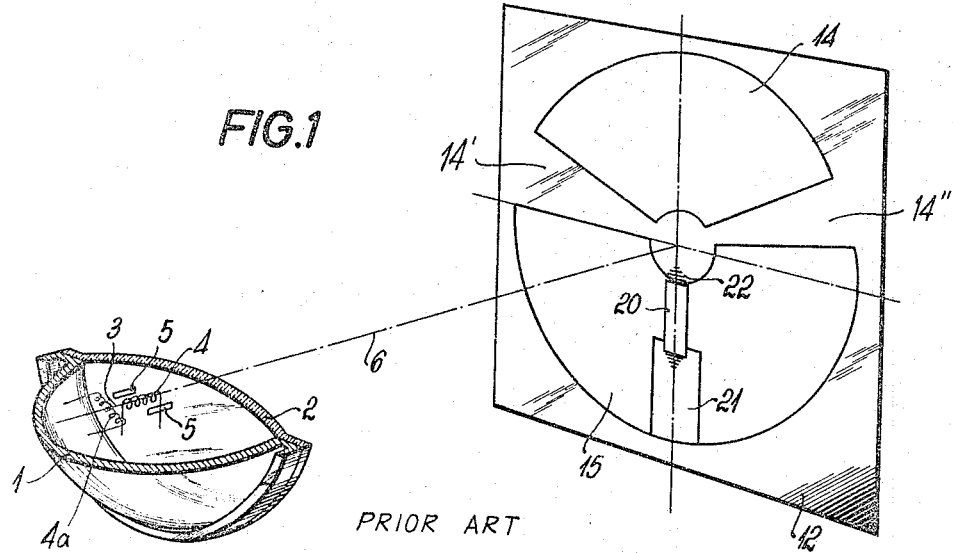
FIG. 1 represents the state of the art by illustrating in perspective view a horizontally sectioned head lamp including a filament extending longitudinally along the optical axis thereof, and the resulting illumination effect on a screen.

Before describing the embodiment of the invention illustrated in the drawings it should be understood that the term "filament" used here below in the specification and in the claims is not intended to be restricted to a straight wire but is to be understood as including at least a filament formed as a straight helix.

In FIGS. 2–11 only the dim light filament or a bulb containing such a filament is illustrated because in many cases headlights are used which contain between the reflector and the lens only one such filament for dim light while a separate headlight with reflector and lens and a separate bright light filament is used for alternatively using one or the other. However, there exist also headlights which contain two separate filaments for dim light and bright light, or low beam and high beam, and therefore in FIGS. 1 and 2 also a filament for bright light or high beam is shown by way of example. The invention is mainly concerned only with the dim light filament and the shield combined therewith.

FIG. 1 illustrates the state of the art. It illustrates a reflector 1, a front plate or lens 2 combined therewith, and a filament 4 arranged substantially along the optical axis 6 of the reflector 1, somewhat forward from the focus 3 thereof. Shield means comprising two plates 5 are arranged on opposite sides of the filament 4 and extending substantially parallel therewith in substantially the same horizontal plane as the filaments. As mentioned above, a bright beam filament 4a may be arranged at the location of the focus 3 as illustrated in FIG. 1.

Figure 2:
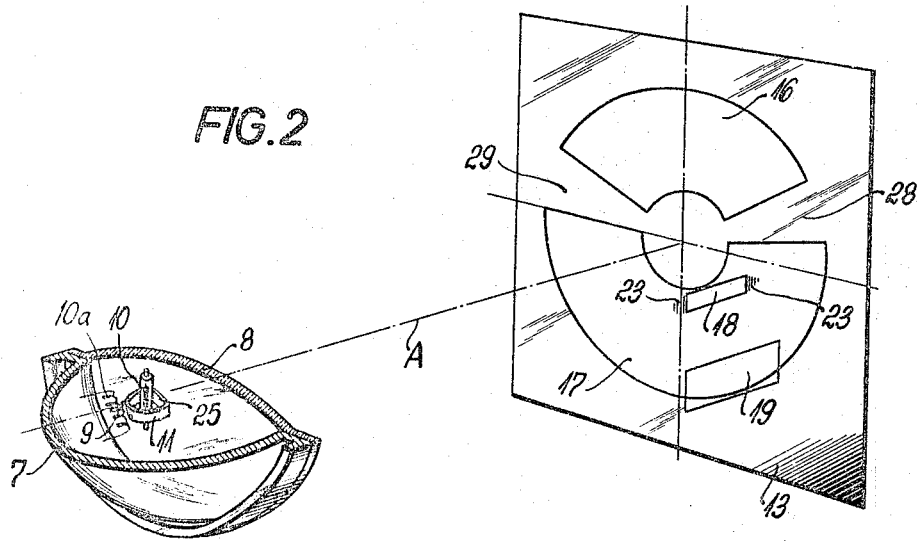
FIG. 2 is a similar perspective view illustrating a sectioned head lamp according to the invention and its illumination effect on a screen.

The arrangement according to the invention as illustrated by FIG. 2 comprises also a reflector 7 and a front plate or lens 8. However, in this case the source of light is a tubular bulb with a filament 10 arranged at a certain distance in front of the focus 9 of the reflector 7 and partly surrounded by an opaque shield 11. The filament 10 extends in a substantially vertical plane transverse of the optical axis A of the reflector as illustrated. Also in this case a separate bright light filament 10a may be arranged at the focus 9 as indicated.

In order to compare the illumination effect of the conventional arrangement according to FIG. 1 with that of the arrangement according to the invention as illustrated by FIG. 2, in both cases a projection screen 12 and 13, respectively, is arranged with its surface transverse of the axes 6 and A, respectively.

As can be seen, in both cases distinctly illuminated sectors appear on the projection screens 12 and 13. In both cases the upper and lower sectors are separated by comparatively dark narrow sectors which are caused by the shield means 5 in FIG. 1 and by the shield 11 of FIG. 2, respectively.

As can be seen the annular sectors 14 and 15 of FIG. 1 have a larger outer radius and smaller inner radius than the corresponding sectors 16 and 17 of FIG. 2. This difference in size of the illuminated areas is due only to the different arrangement or rather orientation of the filaments 4 in FIG. 1 and 10 in FIG. 2, respectively. Consequently, assuming the same amount of light is produced by the filaments 4 and 10, the intensity of light in the illuminated areas or sectors is greater in the case of FIG. 2 than in the case of FIG. 1. Also, the greater central dark area between the sectors 16 and 17 in the case of FIG. 2 reduces the danger of blinding or dazzling human beings in front of the headlights and finally the contrast between light and dark is more clearly defined along the boundaries of the illuminated sectors.

The greater contrast and sharper delineation of the boundaries between light and dark areas will be understood by comparing FIGS. 1 and 2. If for the purpose of explanation it is assumed that the reflecting surface of the reflector 1 is composed of a great number of small mirror areas then it will be understood that in the case of FIG. 1 these small mirror areas will produce on the screen 12 a multitude of small illuminated areas as indicated at 20 and 21. These areas extend in radial direction from the center of the screen 12 or rather from the point where the optical axis 6 intersects the screen surface. Due to this radical orientation of the reflected images of the filament 4 some illumination caused by at least one end of the filament 4 extends into the central circular area which is desired to be kept as dark as possible. This undesirable condition is completely avoided by the arrangement according to the invention illustrated by FIG. 2. In view of the transverse orientation of the filament 10 the plurality of reflecting surface elements of the reflector 7 are bound to produce on the screen 13 a corresponding plurality of illuminated images 18 and 19 of the filament 10 which are bound to extend more or less tangentially with respect to the inner and outer circular boundaries of the illuminated areas 16 and 17. In this case illuminated partial areas 23 caused by the reflection of the ends of the filament 10 do not cause any trouble because they will always be located in areas of the illuminated sectors which are to be illuminated anyway.

The desired transverse orientation of the filament 10 according to the invention can be achieved most advantageously and conveniently by using a tubular bulb, particularly a so-called iodine vapor lamp, which having very small dimensions yet has a very high luminous power and is commercially available. Therefore, so as to be able to utilize standard bulbs, it is advisable to arrange the shield means outside the bulb, advantageously and preferably in the area surrounding the lower half of the filament, and not as is usually done in conventional two-filament lamp inside the bulb. FIG. 2 illustrates such an arrangement according to the invention since it can be seen that a shield 11 is formed as a parabolically curved strip almost entirely surrounding the bulb and filament 10, the upper edge of the shield 11 being located substantially in a horizontal plane passing through the optical axis A and the apex of the parabolic curve being located substantially in the focus of the reflector 7. The forward ends of the parabolic halves of the shield 11 are connected with each other by a straight strip 25 having its upper edge at the same level as the upper edge of the shield 11.

As can be seen from FIG. 1 the narrow dark sectors 14' and 14'' separating the upper and lower illuminated sectors 14 and 15 are differently oriented, the left-hand dark sector 14' having a lower edge which extends horizontally. This is achieved as mentioned above by mounting one of the two plates 5 slightly lower than the other. A similar effect resulting in the orientation of the dark sectors 28 and 29 as illustrated in FIG. 2 can be achieved advantageously by forming for instance a strip-shaped shield according to FIGS. 3 or 4 in such a manner that one portion of the upper edge namely the edge of the portion 26 extends substantially horizontally while the adjacent portion 27 has an upper edge which is inclined against the horizontal at an angle $\alpha$ of e.g. 15°. Thus, a projection of these edges on to a screen in perpendicular direction would constitute an angle of substantially 165°, one side of which is horizontal. As a result in FIG. 2 dark zones or sectors 28 and 29 are produced.

The different orientation of the narrow dark zones 28 and 29 is needed or desirable in order to take into consideration the manner in which oncoming traffic is encountered by the vehicle which carries the respective headlight arrangement. The formation of the shield according to FIG. 3 with the effect illustrated by FIG. 2 applies to traffic conditions in countries where right-hand driving is required. In other countries where left-hand driving is required the opposite inclination of the portion 27 as illustrated by FIG. 4 would be advisable.

Whenever a shield with a partly inclined portion 27 is used it is further advisable to give also to the filament 10 an inclination toward the same side toward which the shield portion 27 is inclined but only to an extent which is one-half of the inclination of the upper edge of the shield portion 27. In other words, in this case the filament 10 would extend in a vertical plane transverse of the optical axis of the reflector but inclined so that the filament 10 extends in a plane through the optical axis but bisecting the angle constituted by the upper edges of the portions 26 and 27.

FIGS. 5–7 illustrate various modifications of the combination of a tubular bulb with an opaque shield, the shield 11a in FIG. 5 being formed as an annular strip of circular contour, tapered in downward direction while in FIG. 6 the shield 11b is formed as a strip of substantially rectangular contour, with rounded corners and the shield 11c is formed mainly as a strip of parabolic contour open in forward direction. In all cases the shields according to the invention may be tapered downwardly. In the case of the circular shield 11a of FIG. 5 the radius of the upper edge of the shield 11a is preferably equal to the distance of the focus 9 of the reflector 7 from the filament 10. In the case of a substantially rectangular shield 11b as shown by FIG. 6 the distance from the filament of at least one of the transverse walls of the shield and the distances of the lateral walls extending parallel with the optical axis A should be equal to the distance between the focus and the filament. In the case of the parabolic shield 11c it is advisable to arrange the apex of the parabolic edge coinciding with the focus of the reflector. The orientation of the parabolic edge of the shield 11c is preferably so determined that the focus of this parabolic edge is located on the axis of the filament 10.

FIG. 8 serves to illustrate that the shield 11d may be shaped in such a manner that it is provided with a bracket 30 which extends from the bottom end of the tubular bulb and supports the actual shield portion 11d. However, the shield may also be formed as illustrated by FIG. 9 in the form of a bonnet 31 constituting a portion of the socket for the bulb and having a mask portion 32 which is located in forward direction opposite the filament 10 and covering substantially the upper half thereof. In this manner light rays are stopped which otherwise would directly be emitted in forward direction and thus would pass in an uncontrolled manner directly through the front plate or lens 8.

If the shield according to the invention is formed of a strip of opaque material then its width i.e. the distance between its upper and lower edge should be larger than the vertical length of the filament in such a manner that, as shown by FIG. 11, a line 35 drawn from the upper end of the filament 10 to the upper edge of the shield 11e forms an angle β with a line 36 drawn from the lower end of the filament 10 to the lower edge of the shield 11b in the same direction radially as the line 35. This angle β should be, preferably in all radial directions of the shield 11e, not less than 5°.

For the sake of completeness it may be mentioned that under certain conditions and circumstances it would also be possible to use a shield which is applied as an opaque, inwardly reflecting layer directly on the glass shell of the bulb.

It should be borne in mind that in a head lamp arrangement according to the invention including a filament 10 extending transversely of the optical axis of the reflector the distance between the filament and the focus of the reflector must not be smaller than a value depending upon the focal length $f$ and the overall diameter D of the reflector. The ratio between these two characteristic dimensions of the reflector is called the aperture ratio $D/f$. FIG. 10 illustrates diagrammatically which is the influence of the aperture ratio on the dimensions and the position of the filament. In FIG. 10, for the purpose of comparison, one-half of a reflector 33 with an extremely small aperture ratio and one-half of a reflector 34 with an extremely large aperture ratio are shown diagrammatically, both reflectors having however the same focus F. The dimensions of the reflector or its aperture ratio, the length and diameter of the filaments $W_1$ and $W_2$ and the distance thereof from the focus F of the reflector must be adjusted with respect to each other in such a manner that an imaginary line drawn from the focus F to any point along the circumferential edge of the reflector does not intersect the filament because otherwise a portion of the light rays emanating from the filament would be emitted from the reflector in a direction parallel with the optical axis and this would cause dazzling or blinding of other drivers encountered on the road. Thus, it can be seen from FIG. 10 that the requirement of a sufficiently large distance between the fialment and the focus is irrelevant in the case of a reflector with a small aperture ratio $D_1/f_1$. However, the distance between the filament and the focus must be increased the greater is the aperture ratio $D_2/f_2$, e.g. in the case of the reflector 34. For the same reason the filament $W_2$ must have a greater distance from the focus F if the length of the filament $W_2$ is increased in order to avoid that the above-mentioned line, namely $V_2$, intersects the filament $W_2$. This would occur for instance if the filament were located at the location of the filament $W_1$ which in the case of the reflector 33 is of course not intersected by the connecting line $V_1$.

It will be understood that each of the elements described above or two or more together, may also find a useful application in other types of a head lamp arrangement including at least one reflector and a source of light therein differing from the types described above.

While the invention has been illustrated and described as embodied in the source of light comprising a filament extending transversely of the optical axis, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desire to be secured by Letters Patent is:

1. In a headlamp arrangement for automotive vehicles and the like adapted to travel on a ground plane and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis; and elongated opaque shield means located at least partly in the rear of said filament and at least partly surrounding the latter and having an upper edge at least the rear portion of which is located at a level not about said optical axis and at least a portion of which extends in a plane substantially parallel to said ground plane.

2. In a headlamp arrangement for automotive vehicles and the like adapted to travel on a ground plane and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis, said optical axis intersecting said filament at a point substantially midway between its ends; and elongated opaque shield means located at least partly in the rear of said filment and at least partly surrounding the latter and having an upper edge at least the rear portion of which is located at a level not above said optical axis and at least a portion of which extends in a plane substantially parallel to said ground plane.

3. In a headlamp arrangemnet for automotive vehicles and the like adapted to travel on a ground plane and including at least two headlights having each a reflector having an optical axis parallel to said ground plane and a source of light therein, in combination, in each headlight a first filament for bright light located at the focus of the reflector and extending along a line transversely of the optical axis of said reflector and parallel to said ground plane; a second filament for dim light located at predetermined distance in front of the focus of the reflector and extending along a line substantially normal to said ground plane and intersecting said optical axis; and elongated opaque shield means located at least partly in the rear of said second filament and at least partly surrounding the latter and having an upper edge which extends at least in the rear of said second filament through the focal point of said reflector and at least a portion of which extends in a substantially horizontal plane at a level not above said optical axis and at least a portion of which extends in a plane substantially parallel to said ground plane.

4. In a headlamp arrangement for automotive vehicles and the like adapted to travel on a ground plane and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis, said optical axis intersecting said filament at a point substantialy midway between its ends; and elongated opaque shield means located at least partly in the rear of said filament and at least partly surrounding the latter and having an upper edge which extends at least in the rear of said second filament through the focal point of said reflector and one portion of which extends in a substantially horizontal plane whereas another portion tapers downwardly from said one portion, said shield means being formed to have a substantially parabolic contour, the apex of the parabola substantially coinciding with said focal point of said reflector and the axis of said parabola substantially conciding with said optical axis of said reflector.

5. An arrangement as claimed in claim 4, wherein said shield means of parabolic contour include a straight strip connecting the ends of the parabolic side portions thereof opposite said apex.

6. In a headlamp arrangement for automotive vehicles and the like adapted to travel on a ground plane and including at least two headlights having each a reflector having an optical axis parallel to said ground plane and a source of light therein, in combintion, in each headlight at least one filament for dim light located at a predetermined distance in front of the focus of the respective reflector and extending along a line substantially normal to said ground plane and intersecting said optical axis, said optical axis intersecting said filament at a point substantially midway between its ends; and elongated opaque shield means located at least partly in the rear of said filament and at least partly surrounding the latter and having an upper edge at least the rear portion of which is located at a level not above said optical axis and at least a portion of which extends in plane substantially parallel to said ground plane, said shield means being formed to have a substantially circular contour surrounding said filament.

7. In a headlamp arrrangement for automotive vehicles and the like adapted to travel on a ground plane and including at least two headlights having each a reflector having an optical axis parallel to said ground plane and a source of light therein, in combination, in each headlight a first filament for bright light located at the focus of the reflector and extending along a line transversely of the optical axis of said reflector and parallel to said ground plane; a second filament for dim light located at a predetermined distance in front of the focus of the respective reflector and extending along a line substantially normal to said ground plane and intersecting said optical axis, said optical axis intersecting said filament at a point substantially midway between its ends; and elongated opaque shield means located at least partly in the rear of said filament and at least partly surrounding the latter and having an upper edge at least the rear portion of which is located at a level not above said optical axis and at least a portion of which extends in a plane substantially parallel to said ground plane, said shield means being formed to have a substantially annular contour surrounding said filament.

8. In a headlamp arrangement for automotive vehicles and the like adapted to travel on a ground plane and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis, said optical axis intersecting said filament at a point substantially midway between its ends; and elongated opaque shield means located at least partly in the rear of said filament and at least partly surrounding the latter and having an upper edge at least the rear portion of which extends through the focal point of said reflector at a level not above said optical axis and at least a portion of which extends in a plane substantially parallel to said ground plane, said shield means being tapered downwardly and formed to have a substantially parabolic contour, the apex of the parabola substantially coinciding with said focal point of said reflector and the axis of said parabola substantially coinciding with said optical axis of said reflector, and said shield means including a straight strip connecting the ends of the parabolic side portions thereof opposite said apex.

9. In a headlamp arrangement for automotive vehicles and the like adapted to travel on a ground plane and including at least two headlights having each a reflector having an optical axis parallel to said ground plane and a source of light therein, in combination, in each headlight a first filament for bright light located at the focus of the reflector and extending along a line transversely of the optical axis of said reflector and parallel to said ground plane; a second filament for dim light located at a predetermined distance in front of the focus of the respective reflector and extending along a line substantially normal to said ground plane and intersecting said optical axis, said optical axis intersecting said filament at a point substantially midway between its ends; and elongated opaque shield means located at least partly in the rear of said second filament and at least partly surrounding the latter and having an upper edge which extends at least in the rear of said second filament through the focal point of said reflector at a level not above said optical axis and at least a portion of which extends in a plane substantially parallel to said ground plane, said shield means being tapered downwardly and formed to have a substantially circular contour surrounding said filament.

10. In a headlamp arrangement for automotive vehicles and the like adapted to travel on a ground plane and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis, said optical axis intersecting said filament at a point substantially midway between its ends; and elongated opaque shield means located at least partly in the rear of said filament and at least partly surrounding the latter and having an upper edge which extends at least in the rear of said filament through the focal point of said reflector at a level not above said optical axis and at least a portion of which extends in a plane substantially parallel to said ground plane, said shield means being tapered downwardly from said portion and formed to have a substantially rectangular contour surrounding said filament.

11. In a headlamp arrangement for automotive vehicles and the like including at least two headlights having each a reflector and a source of light therein, in combination, in each headlight at least one filament for dim light located at a predetermined distance in front of the focus of the respective reflector; and elongated opaque shield means located at least partly in the rear of said filament and at least partly surrounding the latter and having an upper edge which extends at least in the rear of said filament through the focal point of said reflector and at least a portion of which extends in a substantially horizontal plane, while another portion thereof is inclined downwardly so that a perpendicular projection of said portions onto a plane transverse of said optical axis constitutes an angle of substantially 165° one side of which is substantially horizontal, said filament extending transverse to a horizontal plane through the optical axis of said reflector along a line substantially parallel with the bisector of said angle.

12. In a headlamp arrangement for automotive vehicles and the like adapted to travel on a ground and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis; and elongated opaque shield means located at least partly in the rear of said filament and at least partly surrounding the latter and having an upper edge at least the rear portion of which is located at a level not above said optical axis and at least a portion of which extends in a plane substantially parallel to said ground plane, said shield means having at least a portion consisting of a strip with an upper and a lower edge, the strip width between said edges exceeding the length of said filament to such an extent that a ray emanating from the upper end of said filament and touching said upper edge in any one of a plurality of radial directions forms an angle of at least 5° with a ray emanating from the lower end of said filament in the same radial direction and touching said lower edge.

13. In a headlamp arrangement for automative vehicles and the like adapted to travel on a ground plane and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis; and elongated opaque shield means located at least partly in the rear of said filament and at least partly surrounding the latter and having an upper edge at least the rear portion of which is located and not above the said optical axis, said shield means having at least a portion consisting of a strip with an upper and a lower edge, the strip width between said edges exceeding the length of said filament to such an extent that a ray emanating from the upper end of said filament and touching said upper edge in any one of a plurality of radical directions forms an angle of at least 5° with a ray emanating from the lower end of said filament in the same radial direction and touching said lower edge.

14. In a headlamp arrangement for automotive vehicles and the like adapted to travel on a ground plane and including at least two headlights having each a reflector having an optical axis parallel to said ground plane and a source of light therein, in combination, in each headlight a first filament for bright light located at the focus of the reflector and extending along a line transversely of the optical axis of said reflector and parallel to said ground plane; a second filament for dim light located at a predetermined distance in front of the focus of the respective reflector and extending along a line substantially normal to said ground plane and intersecting said optical axis said optical axis intersecting said filament at a point substantially midway between its ends; and elongated opaque shield means located at least partly in the rear of said second filament and at least partly surrounding the latter and having an upper edge which extends at least in the rear of said second filament through the focal point of said reflector at a level not above said optical axis and at least a portion of which extends in a plane substantially parallel to said ground plane, said shield means being formed to have a substantially parabolic contour, the apex of the parabola substantially coinciding with said focal point of said reflector and the axis of said parabola substantially coinciding with said optical axis of said reflector, said shield means having at least a portion consisting of a strip with an upper and a lower edge, the strip width between said edges exceeding the length of said second filament to such an extent that a ray emanating from the upper end of said second filament and touching said upper edge in any one of a plurality of radial directions forms an angle of at least 5° with a ray emanating from the lower end of said second filament in the same radial direction and touching said lower edge.

15. In a headlamp arrangement for automative vehicles and the like adapted to travel on a ground plane and including at least two headlights having each a reflector having an optical axis parallel to said ground plane and a source of light therein, in combination, in each headlight a first filament for bright light located at the focus of the reflector and extending along a line transversely of the optical axis of said reflector and parallel to said ground plane; a second filament for dim light located at a predetermined distance in front of the focus of the respective reflector and extending along a line substantially normal to said ground plane and intersecting said optical axis, said optical axis intersecting said filament at a point substantialy midway between its ends; and elongated opaque shield means located at least partly in the rear of said second filament and at least partly surrounding the latter and having an upper edge which extends at least in the rear of said second filament through the focal point of said reflector at a level not above said optical axis and at least a portion of which extends in a plane substantially parallel to said ground plane, said shield means being formed to have a substantially circular contour surrounding said filament, said shield means having at least a portion consisting of a strip with an upper and a lower edge, the strip width between said edges exceeding the length of said second filament to such an extent that a ray emanating from the upper end of said second filament and touching said upper edge in any one of a plurailty of radial directions forms an angle of at least 5° with a ray emanating from the lower end of said second filament in the same radial direction and touching said lower edge.

16. In a headlamp arrangement for automative vehicles and the like adapted to travel on a ground plane and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis and elongated opaque shield means located at least partly in the rear of said filament and at least partly surrounding the latter and having an upper edge which extends at least in the rear of said filament through the focal point of said reflector at a level not above said optical axis and at least a portion of which extends in a plane substantially parallel to said ground plane, while another portion thereof is inclined downwardly so that a perpendicular projection of said portions onto a plane transverse of said optical axis constitutes an angle of substantially 165° one side of which is substantially horizontal, said shield means having at least a portion consisting of a strip with an upper and a lower edge, the strip width between said edges exceeding the length of said filament to such an extent that a ray emanating from the upper end of said filament and touching said upper edge in any one of a plurailty of radial directions forms an angle of at least 5° with a ray emanating from the lower end of said filament in the same radial direction and touching said lower edge.

17. In a headlamp arrangement for automotive vehicles and the like adapted to travel on a ground plane and including at least two headlights having each a reflector having an optical axis parallel to said ground plane and a source of light therein, in combination, in each headlight a first filament for bright light located at the focus of the reflector and extending along a line transversely of the optical axis of said reflector and parallel to said ground plane; a second filament for dim light located at a predetermined distance in front of the focus of the respective reflector and extending along a line substantially normal to said ground plane and intersecting said optical axis, said optical axis intersecting said second filament at a point substantially midway between its ends; and elongated opaque shield means formed substantially as a bonnet surrounding at least a portion of the lower half of said second filament and having an upper edge at least the rear portion of which facing said reflector extends through the focal point of said reflector at a level not above said optical axis and at least a portion of which extends in a plane substantially parallel to said ground plane.

18. In a headlamp arrangement for automotive vehicles and the like adapted to travel on a ground plane and including at least two headlights having each a reflector having an optical axis parallel to said ground plane and a source of light therein, in combination, in each headlight at least one filament for dim light located at a predetermined distance in front of the focus of the respective reflector and extending along a line substantially normal to said ground plane and intersecting said optical axis and elongated opaque shield means located at least partly in the rear of said filament and at least partly surrounding the latter and having an upper edge at least the rear portion of which is located at a level not above said optical axis and at least a portion of which extends in a plane substantially parallel to said ground plane said shield means including a portion located in forward direction in front of at least the upper half of said filament so as to mask direct forward radiation from said part of said filament.

19. In a headlamp arrangement for automotive vehicles and the like adapted to travel on a ground plane and including at least two headlights having each a reflector having an optical axis parallel to said ground plane and a source of light therein, in combination, in each headlight a first filament for bright light located at the focus of the reflector and extending along a line transversely of the optical axis of said reflector and parallel to said ground plane; a second filament for dim light located at a predetermined distance in front of the focus of the respective reflector and extending along a line substantially normal to said ground plane and intersecting said optical axis said optical axis intersecting said second filament at a point substantially midway between its ends; and elongated opaque shield means located at least partly in the rear of said second filament and at least partly surrounding the latter and having an upper edge portion in the rear of said second filament which extends through the focal point of said reflector at a level not above said optical axis and at least a portion of which extends in a plane substantially parallel to said ground plane, said shield means including a portion located in forward direction in front of at least the upper half of said filament so as to mask direct forward radiation from said part of said filament.

20. In a headlamp arrangement for automotive vehicles and the like adapted to travel on a ground plane and including at least two headlights having each a reflector having an optical axis parallel to said ground plane and a source of light therein, in combination, in each headlight a filament for bright light located substantially at the focus of the respective reflector for high beam production and extending along a line transversely of the optical axis of the reflector and parallel to said ground plane, and separately a second filament for dim light located at a predetermined distance in front of the focus of the respective reflector and extending along a line substantially normal to said ground plane and intersecting said optical axis; and elongated opaque shield means located at least partly in the rear of said second filament and at least partly surrounding the latter and having an upper edge at least the rear portion of which is located at a level not above said optical axis and at least a portion of which extends in a plane substantially parallel to said ground plane.

21. In a headlamp arrangement for automotive vehicles and the like adapted to travel on a ground plane and including at least two headlights having each a reflector having an optical axis parallel to said ground plane and a source of light therein, in combination, in each headlight a filament for bright light located substantially at the focus of the respective reflectors for high beam production and extending along a line transversely of the optical axis of the reflector and parallel to said ground plane, and separately a second filament for dim light located at a predetermined distance in front of the focus of the respective reflector and extending along a line substantially normal to said ground plane and intersecting said optical axis, said second optical axis intersecting said filament at a point substantially midway between its ends; and elongated opaque shield means located at least partly in the rear of said second filament and at least partly surrounding the latter and having an upper edge portion in the rear of said second filament which extends through the focal point of said reflector and having one portion which extends in a plane parallel to said ground plane and located at a level not above said optical axis, and another portion which tapers downwardly from said one portion.

22. An arrangement as claimed in claim 1, wherein the size of said reflector, the location of the ends of said filament and the distance of the latter from said focus of said reflector are so chosen that an imaginary line connecting said focus with any point of the outer edge of said reflector does not intersect any part of said filament.

23. An arrangement as claimed in claim 3, wherein the size of said reflector, the location of the ends of said filament and the distance of the latter from said focus of said reflector are so chosen that an imaginary line connecting said focus with any point of the outer edge of said reflector does not intersect any part of said filament.

References Cited by the Examiner

UNITED STATES PATENTS 2,006,140   6/1935   Honing _____ 313—113 X
2,617,062   11/1952  Rijnders _____ 240—46.19 X

FOREIGN PATENTS 287,446   9/1928   Great Britain.

JAMES W. LAWRENCE, *Primary Examiner.*

S. A. SCHEEBERGER, *Assistant Examiner.*